US012592006B2

(12) United States Patent
Sha

(10) Patent No.: US 12,592,006 B2
(45) Date of Patent: Mar. 31, 2026

(54) METHOD, APPARATUS, ELECTRONIC DEVICE AND STORAGE MEDIUM FOR INFORMATION PROCESSING

(71) Applicant: Beijing Bytedance Network Technology Co., Ltd., Beijing (CN)

(72) Inventor: Bin Sha, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 155 days.

(21) Appl. No.: 18/291,995

(22) PCT Filed: Jul. 27, 2022

(86) PCT No.: PCT/CN2022/108407

§ 371 (c)(1),
(2) Date: Jan. 25, 2024

(87) PCT Pub. No.: WO2023/109140

PCT Pub. Date: Jun. 22, 2023

(65) Prior Publication Data

US 2025/0005813 A1      Jan. 2, 2025

(30) Foreign Application Priority Data

Dec. 14, 2021    (CN) .......................... 202111519152.9

(51) Int. Cl.
*G06T 11/00*          (2006.01)
*G06T 1/60*           (2006.01)

(52) U.S. Cl.
CPC .............. *G06T 11/001* (2013.01); *G06T 1/60* (2013.01)

(58) Field of Classification Search
CPC ......... G06T 11/001; G06T 1/60; G06F 9/544; G06F 9/451; G06F 9/547; G06F 2209/541; G06F 2209/545; G06F 2209/549

(Continued)

(56) References Cited

U.S. PATENT DOCUMENTS 9,348,488 B1 * 5/2016 Renema, II ......... G06F 3/04817
2012/0113091 A1 * 5/2012 Isaacson ................... G06T 1/20
345/418

(Continued)

FOREIGN PATENT DOCUMENTS

CN       107423014 A     12/2017
CN       107450897 A     12/2017
(Continued)

OTHER PUBLICATIONS

International Search Report (with English translation) and Written Opinion issued in PCT/CN2022/108407, dated Oct. 10, 2022, 10 pages provided.

(Continued)

*Primary Examiner* — Karen C Tang
(74) *Attorney, Agent, or Firm* — Fish & Richardson P.C.

(57)          ABSTRACT

The disclosure provides methods and electronic device for information processing. The method of applies to a terminal using a first communication protocol for information comprises: The method generates rendering information corresponding to the display storage buffer on the terminal, based on a pre-requested display storage buffer of a server. The method further generates through an application backend based on an extension protocol of the first communication protocol, submission information containing texture information for generating a display image according to the rendering information and the display storage buffer. The (Continued)

S41

RECEIVE, THROUGH A SERVER PROCESS BASED ON AN EXTENSION PROTOCOL OF THE SECOND COMMUNICATION PROTOCOL, SUBMISSION INFORMATION SENT BY AN APPLICATION BACKEND OF A TERMINAL

S42

GENERATE, IN A VIRTUAL DISPLAY SCREEN CREATED BY THE SERVER PROCESS, A VIRTUAL DISPLAY IMAGE ACCORDING TO TEXTURE INFORMATION CONTAINED IN THE SUBMISSION INFORMATION AND A DISPLAY STORAGE BUFFER CORRESPONDING TO THE SUBMISSION INFORMATION ON THE SERVER

S43

DISPLAY ACCORDING TO THE VIRTUAL DISPLAY IMAGE submission information is information converted by the application backend as recognizable by a server process using a second communication protocol for information transmission The method further submit the submission information to the server process using an extension protocol of the second communication protocol to enable the server process to generate a virtual display image in a virtual display screen of the server according to the submission information.

19 Claims, 5 Drawing Sheets

(58) Field of Classification Search
USPC .......................................................... 709/231
See application file for complete search history.

(56) References Cited

U.S. PATENT DOCUMENTS

| | | | |
|---|---|---|---|
| 2012/0117508 A1 | 5/2012 | Amendolagine | |
| 2015/0113526 A1* | 4/2015 | Baboval .............. | G06F 9/45533 |
| | | | 718/1 |
| 2015/0161754 A1* | 6/2015 | Isaacson ................... | G06T 1/20 |
| | | | 345/520 |
| 2015/0193904 A1* | 7/2015 | Vermeulen ................ | G06T 1/20 |
| | | | 345/522 |
| 2020/0251067 A1* | 8/2020 | Tyler ....................... | G09G 5/363 |
| 2025/0181363 A1* | 6/2025 | Zhurba ..................... | G06F 8/73 |

FOREIGN PATENT DOCUMENTS

| | | | |
|---|---|---|---|
| CN | 112767225 A | 5/2021 |
| CN | 113448662 A | 9/2021 |
| CN | 113467666 A | 10/2021 |
| CN | 113672387 A | 11/2021 |
| CN | 113918366 A | 1/2022 |

OTHER PUBLICATIONS

Office Action issued in Chinese Application No. 202111519152.9, dated Jan. 19, 2022, 5 pages, with English translation.

* cited by examiner

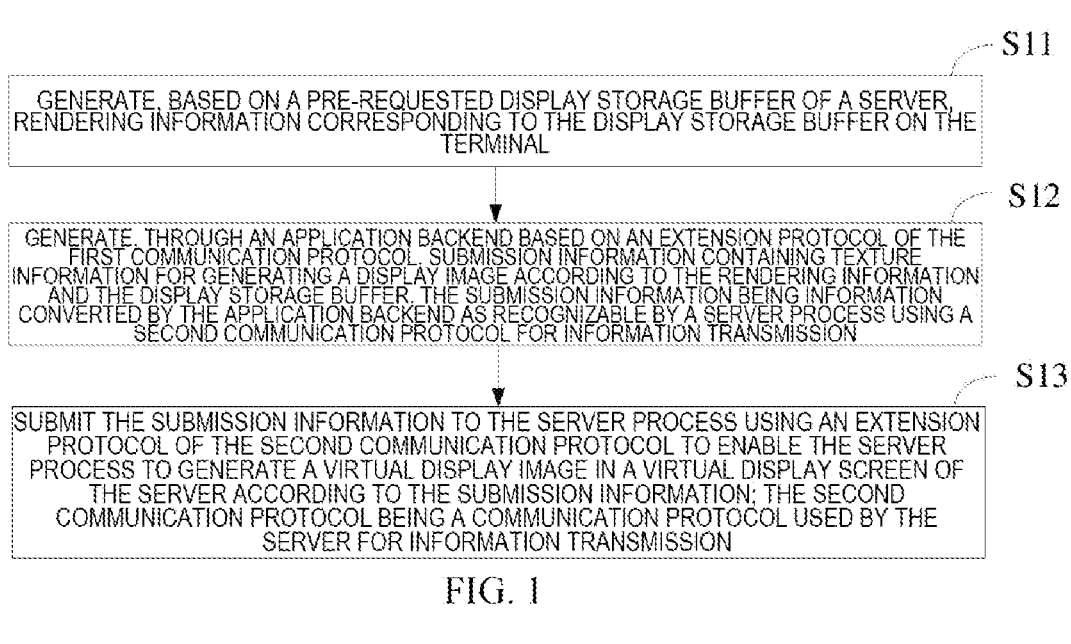

S11

GENERATE, BASED ON A PRE-REQUESTED DISPLAY STORAGE BUFFER OF A SERVER, RENDERING INFORMATION CORRESPONDING TO THE DISPLAY STORAGE BUFFER ON THE TERMINAL

S12

GENERATE, THROUGH AN APPLICATION BACKEND BASED ON AN EXTENSION PROTOCOL OF THE FIRST COMMUNICATION PROTOCOL, SUBMISSION INFORMATION CONTAINING TEXTURE INFORMATION FOR GENERATING A DISPLAY IMAGE ACCORDING TO THE RENDERING INFORMATION AND THE DISPLAY STORAGE BUFFER, THE SUBMISSION INFORMATION BEING INFORMATION CONVERTED BY THE APPLICATION BACKEND AS RECOGNIZABLE BY A SERVER PROCESS USING A SECOND COMMUNICATION PROTOCOL FOR INFORMATION TRANSMISSION

S13

SUBMIT THE SUBMISSION INFORMATION TO THE SERVER PROCESS USING AN EXTENSION PROTOCOL OF THE SECOND COMMUNICATION PROTOCOL TO ENABLE THE SERVER PROCESS TO GENERATE A VIRTUAL DISPLAY IMAGE IN A VIRTUAL DISPLAY SCREEN OF THE SERVER ACCORDING TO THE SUBMISSION INFORMATION; THE SECOND COMMUNICATION PROTOCOL BEING A COMMUNICATION PROTOCOL USED BY THE SERVER FOR INFORMATION TRANSMISSION

FIG. 1

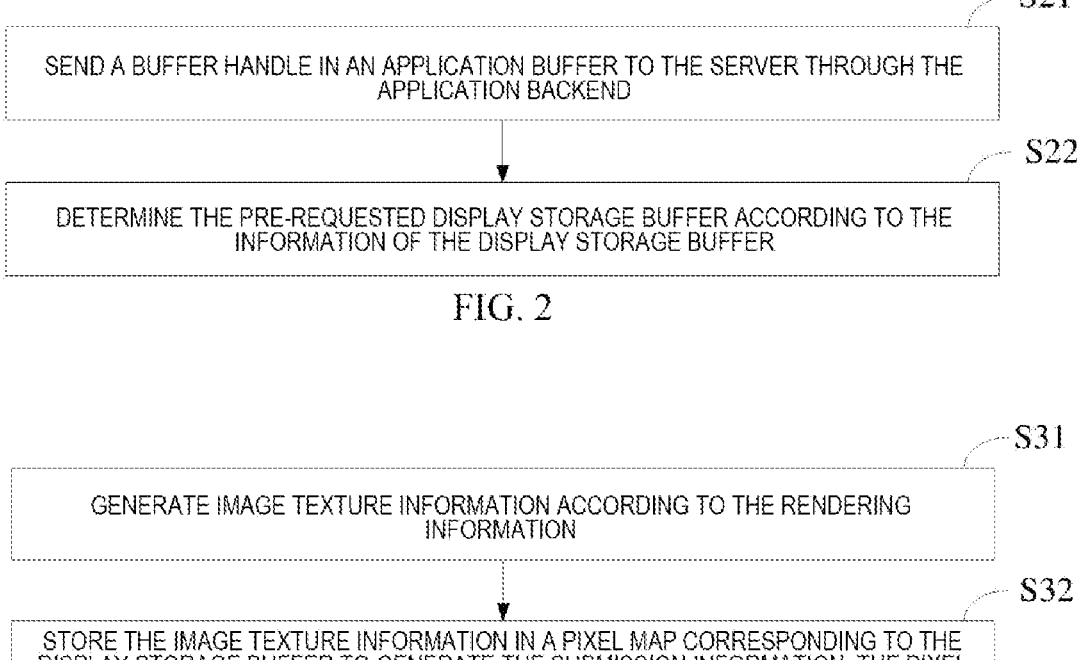

S21

SEND A BUFFER HANDLE IN AN APPLICATION BUFFER TO THE SERVER THROUGH THE APPLICATION BACKEND

S22

DETERMINE THE PRE-REQUESTED DISPLAY STORAGE BUFFER ACCORDING TO THE INFORMATION OF THE DISPLAY STORAGE BUFFER

GENERATE IMAGE TEXTURE INFORMATION ACCORDING TO THE RENDERING INFORMATION

S32

STORE THE IMAGE TEXTURE INFORMATION IN A PIXEL MAP CORRESPONDING TO THE DISPLAY STORAGE BUFFER TO GENERATE THE SUBMISSION INFORMATION, THE PIXEL MAP BEING GENERATED BY THE SERVER ACCORDING TO THE BUFFER HANDLE

FIG. 3

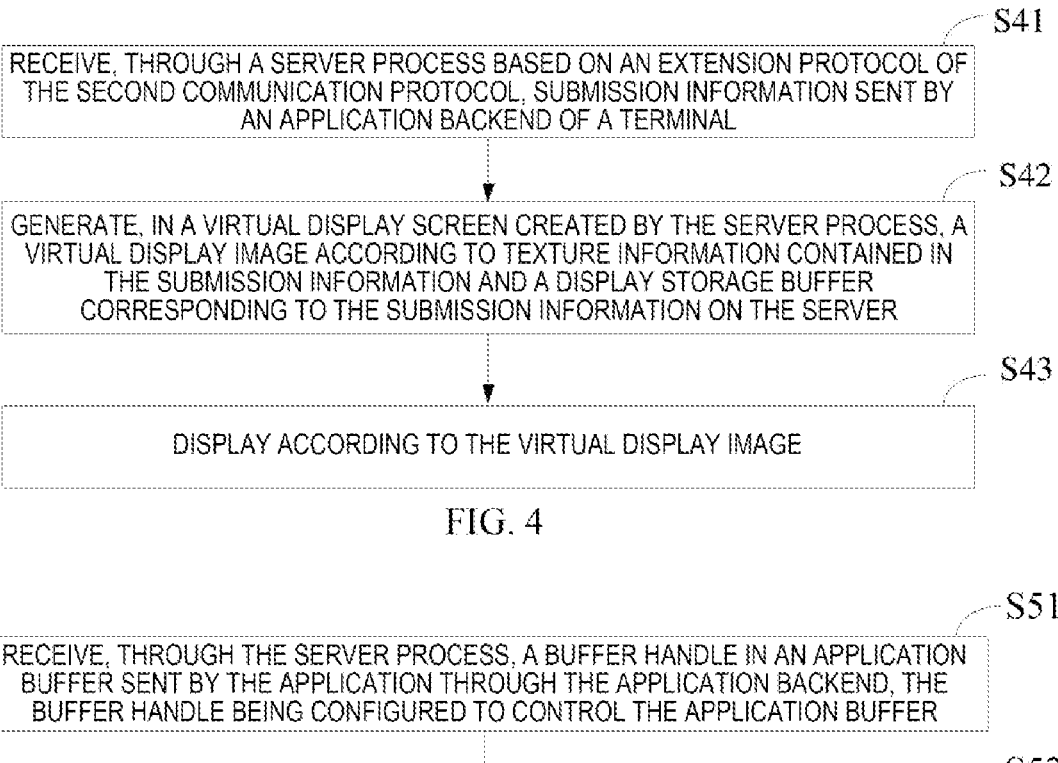

S41

RECEIVE, THROUGH A SERVER PROCESS BASED ON AN EXTENSION PROTOCOL OF THE SECOND COMMUNICATION PROTOCOL, SUBMISSION INFORMATION SENT BY AN APPLICATION BACKEND OF A TERMINAL

S42

GENERATE, IN A VIRTUAL DISPLAY SCREEN CREATED BY THE SERVER PROCESS, A VIRTUAL DISPLAY IMAGE ACCORDING TO TEXTURE INFORMATION CONTAINED IN THE SUBMISSION INFORMATION AND A DISPLAY STORAGE BUFFER CORRESPONDING TO THE SUBMISSION INFORMATION ON THE SERVER

S43

DISPLAY ACCORDING TO THE VIRTUAL DISPLAY IMAGE

FIG. 4

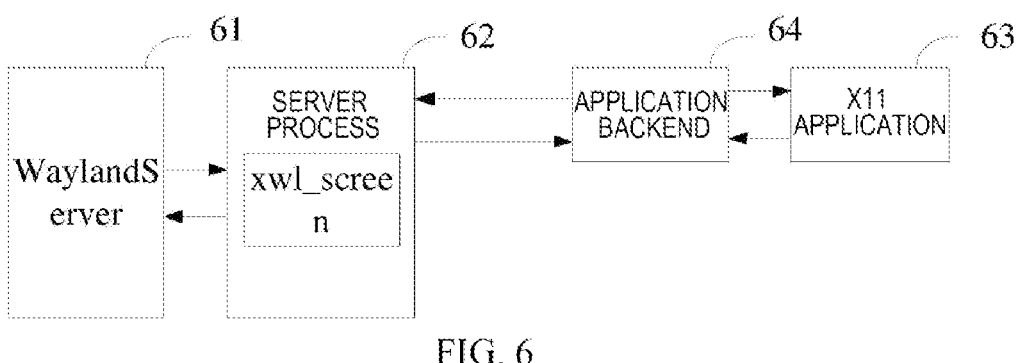

S51

RECEIVE, THROUGH THE SERVER PROCESS, A BUFFER HANDLE IN AN APPLICATION BUFFER SENT BY THE APPLICATION THROUGH THE APPLICATION BACKEND, THE BUFFER HANDLE BEING CONFIGURED TO CONTROL THE APPLICATION BUFFER

S52

SEND, ACCORDING TO THE BUFFER HANDLE, DISPLAY STORAGE BUFFER INFORMATION TO THE APPLICATION THROUGH THE SERVER PROCESS, TO ENABLE THE APPLICATION TO DETERMINE A PRE-REQUESTED BUFFER STORAGE AREA THROUGH THE DISPLAY STORAGE BUFFER INFORMATION, AND SUBMITTINGTHE SUBMISSION INFORMATION BASED ON THE PRE- REQUESTED BUFFER STORAGE AREA

WaylandServer

SERVER PROCESS xwl_screen

APPLICATION BACKEND

X11 APPLICATION

FIG. 6

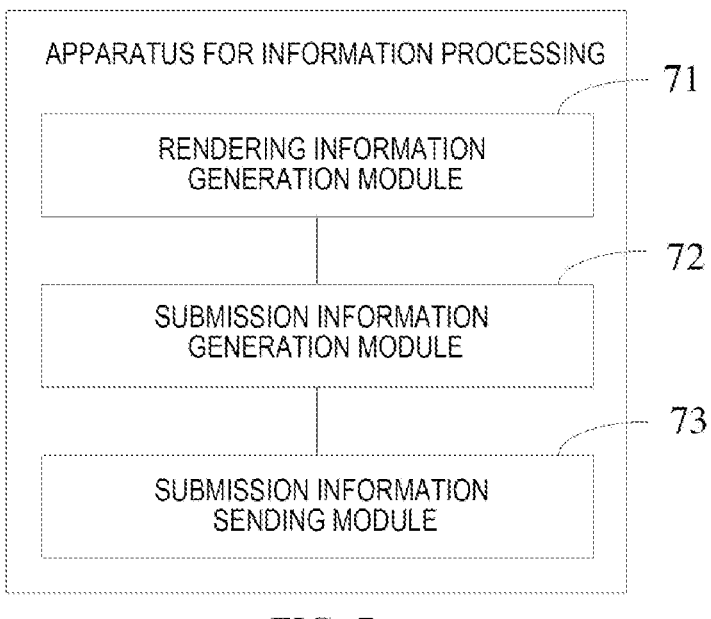
FIG. 7
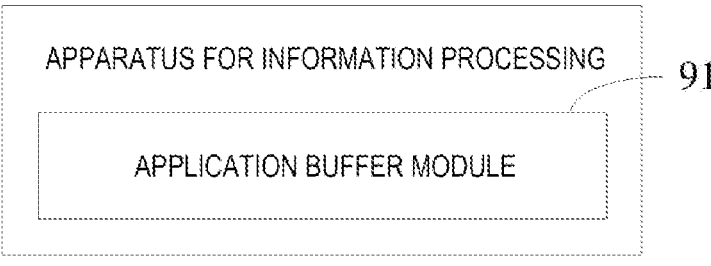
FIG. 8
FIG. 9

METHOD, APPARATUS, ELECTRONIC DEVICE AND STORAGE MEDIUM FOR INFORMATION PROCESSING

CROSS REFERENCE

This application is a 371 national stage application of PCT Application No. PCT/CN2022/108407, filed on Jul. 27, 2022, which claims priority to Chinese Patent Application No. 202111519152.9, filed on Dec. 14, 2021. The disclosures of the aforementioned applications are hereby incorporated by reference in their entireties.

FIELD

The present disclosure relates to a computer technology product, particularly to a method, apparatus, electronic device and storage medium, computer program product and computer program for information processing.

BACKGROUND

The Linux® system is a widely used computer system that exists in various server products and terminal products. Wayland is a simple "Display Server", which belongs to the same level as X Window. It defines how to communicate with the kernel and how to communicate with the client (user). Wayland does not have a traditional server/client mode and needs to run on top of Linux® server. However, in terms of graphic display, Wayland has a unique advantage.

Nowadays, most applications are applications based on X11. X11 is also known as the X Window system, which is a window system for bitmap display. Since the display function of Wayland is better than that of the X11 system, how to make X11 applications have the same high-quality display effect is a problem that X11 applications need to improve.

SUMMARY

Embodiments of the present disclosure provide a method, apparatus, electronic device and storage medium, computer program product and computer program for information processing to solve the problems of the related art, the technical solution is as follows.

In a first aspect, the embodiments of the present disclosure provide a method of information processing which is applied to a terminal using a first communication protocol for information transmission. The method of information processing comprises generating, based on a pre-requested display storage buffer of a server, rendering information corresponding to the display storage buffer on the terminal. The method of information processing further comprises generating, through an application backend based on an extension protocol of the first communication protocol, submission information containing texture information for generating a display image according to the rendering information and the display storage buffer. The submission information is information converted by the application backend as recognizable by a server process using a second communication protocol for information transmission. The method of information processing further comprises submitting the submission information to the server process using an extension protocol of the second communication protocol to enable the server process to generate a virtual display image in a virtual display screen of the server according to the submission information. The second communication protocol is a communication protocol used by the server for information transmission.

In one implementation, the method of information processing further comprises sending a buffer handle in an application buffer to the server through the application backend, to enable the server to control the application buffer according to the buffer handle after receiving the buffer handle, and to return, by a server application, information of the application in the display storage buffer of the server. The method of information processing further comprises determining the pre-requested display storage buffer according to the information of the display storage buffer.

In one implementation, generating submission information containing texture information for generating a display image according to the rendering information and the display storage buffer comprises generating image texture information according to the rendering information and storing the image texture information in a pixel map corresponding to the display storage buffer to generate the submission information The pixel map being generated by the server according to the buffer handle.

In one implementation, the method of information processing further comprises requesting, through an application backend process based on the extension protocol of the first communication protocol, a terminal buffer for storing a queue of pixel maps to be submitted.

In a second aspect, the embodiments of the present disclosure provide a method of information processing which is applied to a server using a second communication protocol for information transmission. The method of information processing comprises receiving, through a server process based on an extension protocol of the second communication protocol, submission information sent by an application backend of a terminal. The terminal uses a first communication protocol for information transmission. The application backend performs information transmission based on an extension protocol of the first communication protocol. The submission information is information converted by the application backend as recognizable by a server process. The method of information processing comprises generating, in a virtual display screen created by the server process, a virtual display image according to texture information contained in the submission information and a display storage buffer corresponding to the submission information on the server. The method of information processing comprises displaying according to the virtual display image.

In one implementation, the method of information processing comprises receiving, through the server process, a buffer handle in an application buffer sent by the application through the application backend. The buffer handle is configured to control the application buffer. The method of information processing comprises sending, according to the buffer handle, display storage buffer information to the application through the server process, to enable the application to determine a pre-requested buffer storage area through the display storage buffer information, and submitting the submission information based on the pre-requested buffer storage area.

In one implementation, the method of information processing further comprises creating the server process based on the extension protocol of the second protocol. The method of information processing comprises constructing, through the server process, the virtual display screen based on the extension protocol of the second protocol.

In a third aspect, the embodiments of the present disclosure further provide an apparatus for information processing which is applied to a terminal using a first communication protocol for information transmission. The apparatus comprises a rendering information generation module configured to generate, based on a pre-requested display storage buffer of a server, rendering information corresponding to the display storage buffer on the terminal. The apparatus further comprises a submission information generation module configured to generate, through an application backend based on an extension protocol of the first communication protocol, submission information containing texture information for generating a display image according to the rendering information and the display storage buffer. The submission information is information converted by the application backend as recognizable by a server process using a second communication protocol for information transmission. The apparatus further comprises a submission information sending module configured to submit the submission information to the server process using an extension protocol of the second communication protocol to enable the server process to generate a virtual display image in a virtual display screen of the server according to the submission information. The second communication protocol is a communication protocol used by the server for information transmission.

In one implementation, the apparatus for information processing further comprises a handle module configured to send a buffer handle in an application buffer to the server through the application backend, to enable the server to control the application buffer according to the buffer handle after receiving the buffer handle, and to return, by a server application, information of the application in the display storage buffer of the server. The apparatus further comprises a determination module configured to determine the pre-requested display storage buffer according to the information of the display storage buffer.

In one implementation, the submission information generation module comprises a texture unit configured to generate image texture information according to the rendering information. The submission information generation module further comprises a texture adding unit configured to store the image texture information in a pixel map corresponding to the display storage buffer to generate the submission information, the pixel map being generated by the server according to the buffer handle.

In one implementation, the apparatus for information processing further comprises an application buffer module configured to request, through an application backend process based on the extension protocol of the first communication protocol, a terminal buffer for storing a queue of pixel maps to be submitted.

In a fourth aspect, the embodiments of the present disclosure further provide an apparatus for information processing which is applied to a server using a second communication protocol for information transmission. The apparatus further comprises a submission information receiving module configured to receive, through a server process based on an extension protocol of the second communication protocol, submission information sent by an application backend of a terminal. The terminal uses a first communication protocol for information transmission. The application backend performs information transmission based on an extension protocol of the first communication protocol. The submission information is information converted by the application backend as recognizable by a server process. The apparatus further comprises a virtual display module configured to generate, in a virtual display screen created by the server process, a virtual display image according to texture information contained in the submission information and a display storage buffer corresponding to the submission information on the server. The apparatus further comprises a display module configured to display according to the virtual display image.

In one implementation, the apparatus for information processing further comprises a handle receiving module configured to receive, through the server process, a buffer handle in an application buffer sent by the application through the application backend. The buffer handle is configured to control the application buffer. The apparatus further comprises a buffer information sending module configured to send, according to the buffer handle, display storage buffer information to the application through the server process, to enable the application to determine a pre-requested buffer storage area through the display storage buffer information, and submitting the submission information based on the pre-requested buffer storage area.

In one implementation, the apparatus for information processing further comprises a process creation module configured to create the server process based on the extension protocol of the second protocol. The apparatus further comprises a virtual display screen construction module configured to construct, through the server process, the virtual display screen based on the extension protocol of the second protocol.

In a fifth aspect, the embodiments of the present disclosure provide a device for information processing. The device for information processing comprises a memory and a processor. Herein, the memory and the processor communicate with each other through an internal connection path. The memory is configured to store instructions. The processor is configured to execute the instructions stored in the memory. When the processor executes the instructions stored in the memory, the processor is caused to perform any of the methods in the above embodiments.

In a sixth aspect, the embodiments of the present disclosure provide a computer readable storage medium having a computer program stored thereon. When the computer program running on a computer, the method of the embodiments of any of the above aspects is performed.

In a seventh aspect, the embodiments of the present disclosure provide a computer program product comprising a computer program. The computer program when executed by a processor implements the method of the embodiments of any of the above aspects.

In an eighth aspect, the embodiments of the present disclosure provide a computer program. The computer program when executed by a processor implements the method of the embodiments of any of the above aspects.

The above technical solutions include advantages or beneficial effects. For example, the method of information processing according to the above embodiments of the present disclosure enables the information transmission between an application using a first communication protocol and a terminal using a second communication protocol. The method of information processing realizes a display function based on the transmitted information, so that when the second communication protocol has more advantages of displaying an image, the application using the first communication protocol for information transmission can realize the image display through the server based on the second communication protocol.

The above summary is only for the purpose of the specification and is not intended to be limiting in any way.

In addition to the illustrative aspects, embodiments, and features described above, further aspects, embodiments, and features of the present disclosure will be readily understood by reference to the accompanying drawings and the following detailed description.

BRIEF DESCRIPTION OF THE DRAWINGS

In the drawings, unless otherwise specified, the same reference numerals throughout multiple drawings indicate the same or similar parts or elements. These drawings are not necessarily drawn to scale. It should be understood that these drawings only depict some embodiments of the present disclosure and should not be regarded as limiting the scope of the present disclosure.

FIG. 1 is a flow diagram of a method of information processing provided by the embodiments of the present disclosure;

FIG. 2 is a flow diagram of a method of information processing provided by the embodiments of the present disclosure;

FIG. 3 is a flow diagram of a method of information processing provided by the embodiments of the present disclosure;

FIG. 4 is a flow diagram of a method of information processing provided by the embodiments of the present disclosure;

FIG. 5 is a flow diagram of a method of information processing provided by the embodiments of the present disclosure;

FIG. 6 is a schematic diagram of a server and a terminal applied to a method of information processing provided by the embodiments of the present disclosure;

FIG. 7 is a schematic diagram of an apparatus for information processing provided by the embodiments of the present disclosure;

FIG. 8 is a schematic diagram of an apparatus for information processing provided by the embodiments of the present disclosure;

FIG. 9 is a schematic diagram of an apparatus for information processing provided by the embodiments of the present disclosure;

DETAILED DESCRIPTION

Figure 10:
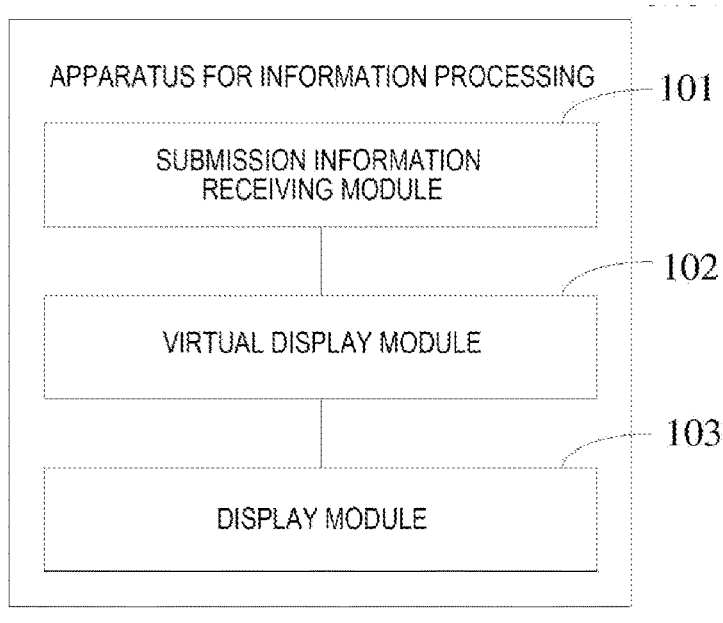
FIG. 10 is a schematic diagram of an apparatus for information processing provided by the embodiments of the present disclosure.

Hereinafter, only certain exemplary embodiments are briefly described. As those skilled in the art will recognize, the described embodiments may be modified in various ways without departing from the spirit or scope of the disclosure. Accordingly, the drawings and description are considered exemplary in nature and not restrictive.

FIG. 1 illustrates a flowchart of a method of information processing according to an embodiment of the present disclosure, applied to a terminal based on a first protocol. As shown in FIG. 1, the method of information processing may include:

Step S11: generate, based on a pre-requested display storage buffer of a server, rendering information corresponding to the display storage buffer on the terminal.

Step S12: generate, through an application backend based on an extension protocol of the first communication protocol, submission information containing texture information for generating a display image according to the rendering information and the display storage buffer, the submission information being information converted by the application backend as recognizable by a server process using a second communication protocol for information transmission; and Step S13: submit the submission information to the server process using an extension protocol of the second communication protocol to enable the server process to generate a virtual display image in a virtual display screen of the server according to the submission information; the second communication protocol being a communication protocol used by the server for information transmission.

In the present embodiment, the pre-requested display storage buffer may be a display storage buffer of the server for storing information to be displayed.

Based on the pre-requested display storage buffer of the server, generating rendering information corresponding to the display storage buffer on the terminal may be generating rendering information based on the pre-requested display storage buffer corresponding to a buffer queue of the terminal and context information of the application of the terminal.

In one specific implementation, the first communication protocol may be a standard window system protocol, responsible for managing the display server with the application window connection, the input device event transmission, graphics buffer operations, etc.

The extension protocol of the first communication protocol may be a transmission protocol based on the first communication protocol that extends the graphics buffer that can be used by the application based on the second communication protocol for information transmission, to achieve a display server and applications that perform information transmission based on the second communication protocol share a synchronous graphics buffer.

In this embodiment, the application backend based on the extension protocol of the first communication protocol may be an application backend for information transmission based on the extension protocol of the first communication protocol.

In the present embodiment, the above application backend may be a graphics buffer queue based on the backend of the second communication protocol implemented based on the extension protocol of the first communication protocol. The above application backend communicates with the display server to implement functions such as request, rendering, and synchronous submission of graphics buffers.

The texture information for display included in the submission information may be generated according to the rendering information.

In one possible implementation, the second communication protocol may be a standard window system protocol, responsible for managing window connections between the server based on the second communication protocol for information transmission and the application based on the second communication protocol for information transmission, input device event transmission and graphics buffer operations.

In one possible implementation, the extension protocol of the second communication protocol shares a graphics buffer that can be used by applications that transmit information based on the second communication protocol between the server based on the second communication protocol implemented based on the second communication protocol for information transmission and the application based on the second communication protocol for information transmission.

In the present embodiment, the application backend based on the extension protocol of the first communication protocol may be used to convert the information sent by the application to the server from the format of the first communication protocol into a format that can be recognized by the server process based on the extension protocol of the second communication protocol.

The format conversion of the communication protocol of the information may include: operation functions such as requesting a graphic buffer, releasing, submitting synchronization as well as converting a protocol of the graphics buffer.

In the present embodiment, the virtual display screen of the server may be created and maintained by the server process. Sending the virtual display image to the server for display may include sending the virtual screen to a real display screen of the server to create a display image.

In the present embodiment, through the image buffer based on the application of the second communication protocol, the graphics buffer queue function is achieved based on the extension protocol of the second communication protocol, so that the sub-process derived based on the first communication protocol may, through the extension protocol of the first communication protocol and based on the application of the second communication protocol, receive function requests such as the request of the graphics buffer, synchronization submission, thereby further sending these function requests to the display server through the first communication protocol.

In one implementation, as shown in FIG. 2, the method of information processing further comprises:

Step S21: send a buffer handle in an application buffer to the server through the application backend; so that the server level can control the application buffer according to the buffer handle after receiving the buffer handle, and return the information of the display storage buffer applied on the server side through the server level application; and Step S22: determine the pre-requested display storage buffer according to the information of the display storage buffer.

In the present embodiment, the buffer handle is used for controlling the application buffer of the terminal, such as requesting, calling and releasing for the application buffer.

Returning the information of the display storage buffer applied to the server through the server application may specifically include returning a pixel map (Pixmap) for carrying the texture information in the display storage buffer through the server application.

In one implementation, generating submission information according to the rendering information and the display storage buffer, as shown in FIG. 3, comprises:

Step S31: generate image texture information according to the rendering information; and Step S32: store the image texture information in a pixel map corresponding to the display storage buffer to generate the submission information, the pixel map being generated by the server according to the buffer handle.

In the present embodiment, the image texture information may be used to generate an image to be displayed.

In one implementation, the method of information processing further comprises:

requesting, through an application backend process based on the extension protocol of the first communication protocol, a terminal buffer for storing a queue of pixel maps to be submitted.

The embodiments of the present disclosure also provide a method of information processing, applied to a server using a second communication protocol for information transmission, as shown in FIG. 4, comprising:

In step S41, receive, through a server process based on an extension protocol of the second communication protocol, submission information sent by an application backend of a terminal; the terminal uses the first communication protocol for information transmission, and the application backend transmits information based on the extension protocol of the first communication protocol. The submission information is converted by the application backend into information recognizable by the server process.

Step S42: generate, in a virtual display screen created by the server process, a virtual display image according to texture information contained in the submission information and a display storage buffer corresponding to the submission information on the server; and Step S43: display according to the virtual display image.

In one embodiment, as shown in FIG. 5, the method of information processing further comprises:

Step S51: receive, through the server process, a buffer handle in an application buffer sent by the application through the application backend, the buffer handle being configured to control the application buffer; and Step S52: send, according to the buffer handle, display storage buffer information to the application through the server process, to enable the application to determine a pre-requested buffer storage area through the display storage buffer information, and submitting the submission information based on the pre-requested buffer storage area.

In the present embodiment, the server may, after receiving the buffer handle, generate a Pixmap carrying texture information and send the Pixmap as part of the display storage buffer information to the application.

In one embodiment, the method of information processing further comprises:

creating the server process based on the extension protocol of the second protocol; and constructing, through the server process, the virtual display screen based on the extension protocol of the second protocol.

In an example of the present disclosure, the first communication protocol is the X protocol, namely X Window or X Protocol, also known as the X Window System Protocol. The second Communication Protocol may be the Wayland protocol, which is a graphics display protocol (Protocol). The Wayland protocol divides a graphics system into a graphics application client and a graphics display compositor. The graphics application client and the graphics display compositor communicate through the Wayland protocol. As shown in FIG. 6, the server includes WaylandServer 61, server process (Xwayland) 62, and the terminal includes X11 application 63 and application backend 64.

In the start-up phase of Linux® system of the server, the desktop system of the Linux® system may create a Wayland Server, which is a server that uses the second communication protocol for information transmission, monitoring all connections of Wayland protocol window applications, including creating windows, registering agents, and monitoring agent events.

In the start-up phase of the WaylandServer, this example generates the sub-process Xwayland of the WaylandServer through the Fork mechanism (forking mechanism or cloning mechanism), that is, the server process in the previous embodiment, which is used to process all connections of the X11 protocol application. The Xwayland process will construct the virtual screen xwl_screen for the Wayland protocol in the initialization phase. The virtual screen xwl_screen for the Wayland protocol mainly completes the communication connection with the WaylandServer by registering and monitoring the Wayland actual screen-related protocols, such as wl_display, wl_register, etc. Herein, wl_register is an actual screen registration protocol, which may also be used to request a display storage. wl_display is an actual screen display protocol, which may also be used to realize the submission of buffer-related information and the synchronization of buffer-related information between the server process and the server.

xwl_screen will initialize and construct a glamor backend in the initialization phase. Glamor is mainly used to provide hardware acceleration function of a graphics card for X11 protocol applications and related interfaces for X11. In this example, a custom backend glamor_wayland_android is used as the application backend to provide Android® graphics driver acceleration function for X11 protocol applications.

glamor_wayland_android registers a Wayland extension protocol proxy android wlegl in the initialization phase to communicate with the WaylandServer and to request Android® driver-related resources.

After registering the Wayland extension protocol proxy, glamor_wayland_android initializes the screen interface. glamor_wayland_android will create and destroy buffer functions for the SreenPtr interface held by the xwl_screen. The ScreenPtr is a standard protocol interface of the X11 application, and the window operation of the X11 application will maintain the window function through this interface. At the same time, glamor_wayland_android will register the X11 extension protocol interface with ScreenPtr to construct and obtain Pixmap, which is the standard protocol interface for X11 used to manage the graphics buffer.

When creating a window, the X11 application will construct a window buffer through a standard interface eglCreateWindowSurface of the Embedded Graphic Library (EGL). In this example, by constructing the X11 backend for EGL, while creating a window buffer for EGL, N (e.g., 3) buffer queues are requested for the window at the X11 terminal through a Gralloc driver module.

When starting rendering, the X11 application obtains a current context of the application through a standard interface eglMakeCurrent of the EGL. After generating rendering information, the EGL driver will call back the dequeueBuffer interface of the window buffer to request a buffer for storing rendering information. In this example, a hardware buffer may be retrieved from the buffer queue and returned to the EGL driver, marked as used.

When completing rendering a frame of data, the X11 application submits the buffer data to the server through a standard interface eglSwapBuffer of the EGL. In this example, through the constructed EGL X11 backend, the used buffer is first returned to the queue and cleared with a marker. Then, the buffer handle in the buffer is passed to the Xwayland process through the extended X11 protocol in exchange for a Pixmap object. In this example, the buffer handle is a concept of the Windows® system, which can also be referred to as a file descriptor FD (file description) in Linux®. After receiving the remote buffer handle fd through the X extension protocol, the Xwayland process creates an EGLClientBuffer (application buffer) based on the handle and generates an EGLImage texture. Finally, the holding object Pixmap that creates the EGLImage texture is returned to the application.

After getting Pixmap, the X11 application will submit Pixmap to a xwayland process for display through a standard protocol interface xcb_present_pixmap for X11. After receiving Pixmap, Xwayland takes out the EGLImage texture it holds. Through the Wayland protocol proxy wl_display maintained in xwl_screen, the texture is submitted to waylandServer through wl_surface_attach, wl_surface_commit and finally displayed on the screen.

It should be noted that although the X11 application and Wayland protocol are used as examples to introduce the method of information processing as described above, those skilled in the art can understand that the present disclosure should not be limited to this. In fact, users can flexibly set the first communication protocol and the second communication protocol according to personal preferences and/or actual application scenarios, as long as the display of the screen can be realized.

In this way, by converting the information of the first communication protocol and the information of the second communication protocol, the method of information processing according to the above embodiment of the present disclosure can transmit information between the application using the first communication protocol and the terminal using the second communication protocol, and the display function is realized based on the transmitted information, so that when the second communication protocol has the advantage of displaying an image, the application using the first communication protocol for information transmission can implement the display of image by a server based on the second communication protocol.

FIG. 7 illustrates a block diagram of a structure of an apparatus for information processing according to an embodiment of the present disclosure. As shown in FIG. 7, the apparatus is applied to the terminal using a first communication protocol for information transmission, and may include:

a rendering information generation module 71 configured to generate, based on a pre-requested display storage buffer of a server, rendering information corresponding to the display storage buffer on the terminal;

a submission information generation module 72 configured to generate, through an application backend based on an extension protocol of the first communication protocol, submission information containing texture information for generating a display image according to the rendering information and the display storage buffer, the submission information being information converted by the application backend as recognizable by a server process using a second communication protocol for information transmission; and a submission information sending module 73 configured to submit the submission information to the server process using an extension protocol of the second communication protocol to enable the server process to generate a virtual display image in a virtual display screen of the server according to the submission information; the second communication protocol being a communication protocol used by the server for information transmission.

In one embodiment, as shown in FIG. 8, the apparatus for information processing further comprises:

a handle module 81 configured to send a buffer handle in an application buffer to the server through the application backend, to enable the server to control the application buffer according to the buffer handle after receiving the buffer handle, and to return, by a server application, information of the application in the display storage buffer of the server; and a determination module 82 configured to determine the pre-requested display storage buffer according to the information of the display storage buffer.

In one embodiment, the submission information generation module comprises:

a texture unit configured to generate image texture information according to the rendering information; and a texture adding unit configured to store the image texture information in a pixel map corresponding to the display storage buffer to generate the submission information, the pixel map being generated by the server according to the buffer handle.

In one embodiment, as shown in FIG. 9, the apparatus for information processing further comprises:

an application buffer module 91 configured to request, through an application backend process based on the extension protocol of the first communication protocol, a terminal buffer for storing a queue of pixel maps to be submitted.

The embodiments of the present disclosure also provide an apparatus for information processing, applied to a server using a second communication protocol for information transmission, as shown in FIG. 10, the apparatus may comprise:

a submission information receiving module 101 configured to receive, through a server process based on an extension protocol of the second communication protocol, submission information sent by an application backend of a terminal; the terminal using a first communication protocol for information transmission, the application backend performing information transmission based on an extension protocol of the first communication protocol, and the submission information being information converted by the application backend as recognizable by a server process;

a virtual display module 102 configured to generate, in a virtual display screen created by the server process, a virtual display image according to texture information contained in the submission information and a display storage buffer corresponding to the submission information on the server; and a display module 103 configured to display according to the virtual display image.

Figure 11:
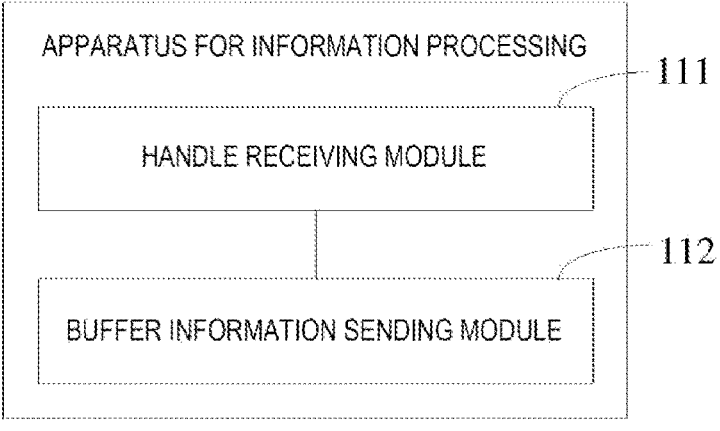
FIG. 11 is a schematic diagram of an apparatus for information processing provided by the embodiments of the present disclosure.

In one embodiment, as shown in FIG. 11, the apparatus for information processing further comprises:

a handle receiving module 111 configured to receive, through the server process, a buffer handle in an application buffer sent by the application through the application backend, the buffer handle being configured to control the application buffer; and a buffer information sending module 112 configured to send, according to the buffer handle, display storage buffer information to the application through the server process, to enable the application to determine a pre-requested buffer storage area through the display storage buffer information, and submitting the submission information based on the pre-requested buffer storage area.

Figure 12:
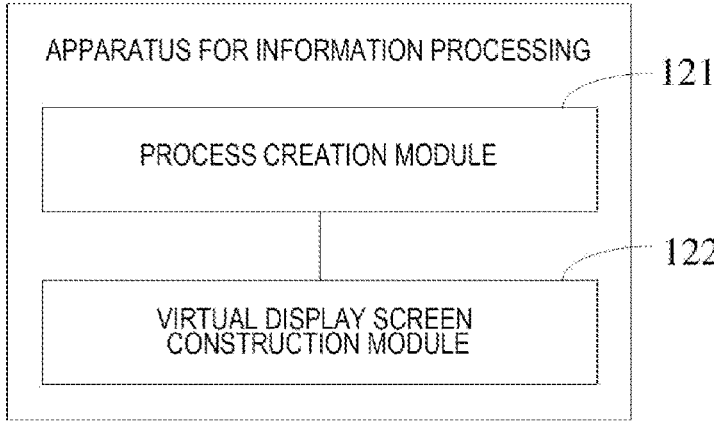
FIG. 12 is a schematic diagram of an apparatus for information processing provided by the embodiments of the present disclosure.

In one embodiment, as shown in FIG. 12, the apparatus for information processing further comprises:

a process creation module 121 configured to create the server process based on the extension protocol of the second protocol; and a virtual display screen construction module 122 configured to construct, through the server process, the virtual display screen based on the extension protocol of the second protocol.

The function of each module in each device provided in the embodiments of the present disclosure may refer to the corresponding method described above, not repeated herein.

Figure 13:
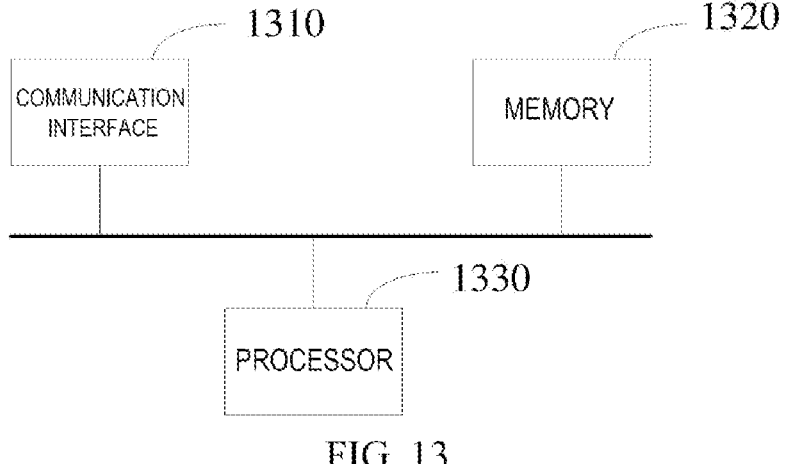
FIG. 13 is a block diagram of a structure of a device for information processing provided by the embodiments of the present disclosure.

FIG. 13 illustrates a block diagram of a structure of a device for information processing provided by the embodiments of the present disclosure. As shown in FIG. 13, the device for information processing includes a memory 1310 and a processor 1320, and the memory 1310 stores a computer program that can be executed on the processor 1320. The processor 1320 when performing the computer program implements the method of information processing in the embodiments above. The number of the memory 1310 and the processor 1320 may be one or more.

The device for information processing further includes:

a communication interface 1330 configured to communicate with external devices for data exchange and transmission.

If the memory 1310, processor 1320, and communication interface 1330 are implemented independently, the memory 1310, processor 1320, and communication interface 1330 may be interconnected and communicate with each other through a bus. The bus may be an Industry Standard Architecture (ISA) bus, a Peripheral Component Interconnect (PCI) bus, or an Extended Industry Standard Architecture (EISA) bus, etc. The bus may include an address bus, a data bus, a control bus, etc. For convenience of representation, only one thick line is used in FIG. 13, but it does not mean that there is only one bus or one type of bus.

In some embodiments, if the memory 1310, processor 1320 and communication interface 1330 integrated on a chip, the memory 1310, processor 1320 and communication interface 1330 may communicate with each other through an internal interface.

The embodiments of the present disclosure provide a computer readable storage medium storing a computer program that implements the method provided in the embodiments of the present disclosure when executed by a processor.

The embodiments of the present disclosure also provide a chip. The chip includes a processor for calling and running instructions stored in the memory from the memory, such that the chip-mounted communication device performs the method provided by the embodiments of the present disclosure.

The embodiments of the present disclosure also provide a chip. The chip includes an input interface, an output interface, a processor and a memory. The input interface, the output interface, the processor and the memory may be connected by an internal connection path. The processor is configured for executing the code in the memory. When the code is executed, the processor is configured for performing the method provided in the embodiments of the present disclosure.

The embodiments of the present disclosure also provide a computer program product, comprising a computer program, the computer program, when executed by a processor, implementing the method provided in the embodiments of the present disclosure.

The embodiments of the present disclosure also provide a computer program that, when executed by a processor, implements the method provided in the embodiments of the present disclosure.

It should be understood that the above processor may be a Central Processing Unit (CPU), as well as other general-purpose processors, Digital Signal Processing (DSP), Application Specific Integrated Circuit (ASIC), Field-Programmable Gate Array (FPGA) or other programmable logic devices, discrete gate or transistor logic devices, discrete hardware components, etc. The general-purpose processor may be a microprocessor or any conventional processor. It is worth noting that the processor may be a processor that supports advanced RISC machines (ARM) architecture.

In some examples, the memory may include read-only memory and random access memory, and may also include non-volatile random access memory. The memory may be volatile memory or non-volatile memory, or may include both volatile and non-volatile memory. Herein, non-volatile memory may include read-only memory (ROM), programmable read-only memory (PROM), erasable programmable read-only memory (EPROM), electrically erasable programmable read-only memory (EEPROM), or flash memory. Volatile memory may include random access memory (RAM), which is used as an external cache. By way of illustration but not limitation, many forms of RAM are available. For example, static random access memory (static RAM, SRAM), dynamic random access memory (DRAM), synchronous dynamic random access memory (synchronous DRAM, SDRAM), double data rate synchronous dynamic random access memory (double date data SDRAM, DDR SDRAM), enhanced synchronous dynamic random access memory (enhanced SDRAM, ESDRAM), synchlink dynamic random access memory (synchlink DRAM, SLDRAM) and direct memory bus random access memory (direct Rambus RAM, DR RAM).

In the above embodiments, it may be implemented in whole or in part by software, hardware, firmware, or any combination thereof. When implemented using software, it may be implemented in whole or in part in the form of a computer program product. The computer program product includes one or more computer instructions. When the computer program instructions are loaded and executed on a computer, the processes or functions according to the present disclosure are generated in whole or in part. The computer may be a general-purpose computer, a special-purpose computer, a computer network, or other programmable device. The computer instructions may be stored in a computer readable storage medium or transmitted from one computer readable storage medium to another.

In the description of this specification, the reference terms "one embodiment", "some embodiments", "example", "specific example", or "some examples" mean that the specific features, structures, materials, or characteristics described in conjunction with the embodiment or example are included in at least one embodiment or example disclosed in this specification. Moreover, the specific features, structures, materials, or characteristics described may be combined in any one or more embodiments or examples in a suitable manner. In addition, those skilled in the art may integrate and combine different embodiments or examples described in this specification and the features of different embodiments or examples without contradiction.

In addition, the terms "first" and "second" are used for descriptive purposes only and should not be understood as indicating or implying relative importance or implying the number of technical features indicated. Therefore, features defined as "first" and "second" may explicitly or implicitly include at least one such feature. In the description of this disclosure, the meaning of "a plurality of" is two or more, unless otherwise specifically limited.

Any process or method description in the flowchart or otherwise described herein may be understood to represent modules, segments, or portions of code that include one or more executable instructions for implementing the particular logical functions or steps of the process. And the scope of preferred embodiments of the present disclosure includes additional implementations in which functions may be performed in a substantially simultaneous manner or in reverse order depending on the functions involved, not in the order shown or discussed.

The logic and/or steps represented in the flowcharts or otherwise described herein, e.g., may be considered a predetermined sequence list of executable instructions for implementing logical functions, and may be embodied in any computer readable medium, for use with or in combination with instruction execution system, apparatus, or device (e.g., a computer-based system, a system including a processor, or other system that may fetch instructions from and execute instructions from the instruction execution system, apparatus, or device), or use in conjunction with these instruction execution system, apparatus, or device.

It should be understood that the various parts of the present disclosure may be implemented in hardware, software, firmware, or a combination thereof. In the above embodiments, multiple steps or methods may be implemented in software or firmware stored in a memory and executed by a suitable instruction execution system. All or part of the steps of the method of the above embodiments may be completed by instructing the relevant hardware through a program, which may be stored in a computer readable storage medium. When executed, the program includes one of the steps of the method embodiment or a combination thereof.

In addition, each functional unit in the various embodiments of the present disclosure may be integrated into one processing module, each unit may be physically separate, or two or more units may be integrated in a module. The above integrated module may be implemented in the form of hardware or software functional modules. If the integrated module is implemented in the form of software functional modules and sold or used as an independent product, it can also be stored in a computer readable storage medium. The storage medium may be a read-only memory, magnetic disk or optical disk, etc.

The above is only a detailed description of the present disclosure, but the protection scope of the present disclosure is not limited thereto. Any skilled person in the art can easily think of various changes or replacements within the technical scope of the present disclosure, which should be covered within the protection scope of the present disclosure. Therefore, the protection scope of the present disclosure should be based on the protection scope of the claims.

I claim:

1. A method of information processing, applied to a terminal using a first communication protocol for information transmission and comprising:

generating, based on a pre-requested display storage buffer of a server, rendering information corresponding to the display storage buffer on the terminal;

generating, through an application backend based on an extension protocol of the first communication protocol, submission information containing texture information for generating a display image according to the rendering information and the display storage buffer, the submission information being information converted by the application backend as recognizable by a server process using a second communication protocol for information transmission; and submitting the submission information to the server process using an extension protocol of the second communication protocol to enable the server process to generate a virtual display image in a virtual display screen of the server according to the submission information, the second communication protocol being a communication protocol used by the server for information transmission.

2. The method of claim 1, further comprising:

sending a buffer handle in an application buffer to the server through the application backend, to enable the server to control the application buffer according to the buffer handle after receiving the buffer handle, and to return, by a server application, information of an application in the display storage buffer of the server; and determining the pre-requested display storage buffer according to the information of the display storage buffer.

3. The method of claim 1, wherein generating submission information containing texture information for generating a display image according to the rendering information and the display storage buffer comprises:

generating image texture information according to the rendering information; and storing the image texture information in a pixel map corresponding to the display storage buffer to generate the submission information, the pixel map being generated by the server according to a buffer handle.

4. The method of claim 1, further comprising:

requesting, through an application backend process based on the extension protocol of the first communication protocol, a terminal buffer for storing a queue of pixel maps to be submitted.

5. A method of information processing, applied to a server using a second communication protocol for information transmission and comprising:

receiving, through a server process based on an extension protocol of the second communication protocol, submission information sent by an application backend of a terminal; the terminal using a first communication protocol for information transmission, the application backend performing information transmission based on an extension protocol of the first communication protocol, and the submission information being information converted by the application backend as recognizable by a server process;

generating, in a virtual display screen created by the server process, a virtual display image according to texture information contained in the submission information and a display storage buffer corresponding to the submission information on the server; and displaying according to the virtual display image.

6. The method of claim 5, further comprising:

receiving, through the server process, a buffer handle in an application buffer sent by an application through the application backend, the buffer handle being configured to control the application buffer; and sending, according to the buffer handle, display storage buffer information to the application through the server process, to enable the application to determine a pre-requested buffer storage area through the display storage buffer information, and submitting the submission information based on the pre-requested buffer storage area.

7. The method of claim 5, further comprising:

creating the server process based on the extension protocol of the second communications protocol; and constructing, through the server process, the virtual display screen based on the extension protocol of the second communications protocol.

8. A device for information processing, comprising: a processor and a memory, the memory storing instructions that, when executed by the processor, cause the device at least to:

generate, based on a pre-requested display storage buffer of a server, rendering information corresponding to the display storage buffer on a terminal;

generate, through an application backend based on an extension protocol of a first communication protocol, submission information containing texture information for generating a display image according to the rendering information and the display storage buffer, the submission information being information converted by the application backend as recognizable by a server process using a second communication protocol for information transmission; and submit the submission information to the server process using an extension protocol of the second communication protocol to enable the server process to generate a virtual display image in a virtual display screen of the server according to the submission information; the second communication protocol being a communication protocol used by the server for information transmission;

wherein the instructions, when executed by the processor, further cause the device at least to:

receive, through a server process based on an extension protocol of the second communication protocol, submission information sent by an application backend of a terminal; the terminal using a first communication protocol for information transmission, the application backend performing information transmission based on an extension protocol of the first communication protocol, and the submission information being information converted by the application backend as recognizable by a server process;

generate, in a virtual display screen created by the server process, a virtual display image according to texture information contained in the submission information and a display storage buffer corresponding to the submission information on the server; and display according to the virtual display image.

9. The device of claim 8, wherein the instructions, when executed by the processor, further cause the device to:

send a buffer handle in an application buffer to the server through the application backend, to enable the server to control the application buffer according to the buffer handle after receiving the buffer handle, and to return, by a server application, information of an application in the display storage buffer of the server; and determine the pre-requested display storage buffer according to the information of the display storage buffer.

10. The device of claim 8, wherein the instructions, when executed by the processor, further cause the device to:

generate image texture information according to the rendering information; and store the image texture information in a pixel map corresponding to the display storage buffer to generate the submission information, the pixel map being generated by the server according to a buffer handle.

11. The device of claim 8, wherein the instructions, when executed by the processor, further cause the device to:

request, through an application backend process based on the extension protocol of the first communication protocol, a terminal buffer for storing a queue of pixel maps to be submitted.

12. The device of claim 8, wherein the instructions, when executed by the processor, further cause the device to:

receive, through the server process, a buffer handle in an application buffer sent by an application through the application backend, the buffer handle being configured to control the application buffer; and send, according to the buffer handle, display storage buffer information to the application through the server process, to enable the application to determine a pre-requested buffer storage area through the display storage buffer information, and submit the submission information based on the pre-requested buffer storage area.

13. The device of claim 8, wherein the instructions, when executed by the processor, further cause the device to:

create the server process based on the extension protocol of the second communications protocol; and construct, through the server process, the virtual display screen based on the extension protocol of the second communications protocol.

14. A computer readable medium comprising instructions stored thereon for causing a device at least to:

generate, based on a pre-requested display storage buffer of a server, rendering information corresponding to the display storage buffer on a terminal;

generate, through an application backend based on an extension protocol of a first communication protocol, submission information containing texture information for generating a display image according to the rendering information and the display storage buffer, the submission information being information converted by the application backend as recognizable by a server process using a second communication protocol for information transmission; and submit the submission information to the server process using an extension protocol of the second communication protocol to enable the server process to generate a virtual display image in a virtual display screen of the server according to the submission information; the second communication protocol being a communication protocol used by the server for information transmission;

wherein the instructions further cause the device to:

receive, through a server process based on an extension protocol of the second communication protocol, submission information sent by an application backend of a terminal; the terminal using a first communication protocol for information transmission, the application backend performing information transmission based on an extension protocol of the first communication protocol, and the submission information being information converted by the application backend as recognizable by a server process;

generate, in a virtual display screen created by the server process, a virtual display image according to texture information contained in the submission information and a display storage buffer corresponding to the submission information on the server; and display according to the virtual display image.

15. The medium of claim 14, wherein the instructions further cause the device to:

send a buffer handle in an application buffer to the server through the application backend, to enable the server to control the application buffer according to the buffer handle after receiving the buffer handle, and to return, by a server application, information of an application in the display storage buffer of the server; and determine the pre-requested display storage buffer according to the information of the display storage buffer.

16. The medium of claim 14, wherein the instructions further cause the device to:

generate image texture information according to the rendering information; and store the image texture information in a pixel map corresponding to the display storage buffer to generate the submission information, the pixel map being generated by the server according to a buffer handle.

17. The medium of claim 14, wherein the instructions further cause the device to:

request, through an application backend process based on the extension protocol of the first communication protocol, a terminal buffer for storing a queue of pixel maps to be submitted.

18. The medium of claim 14, wherein the instructions further cause the device to:

receive, through the server process, a buffer handle in an application buffer sent by an application through the application backend, the buffer handle being configured to control the application buffer; and send, according to the buffer handle, display storage buffer information to the application through the server process, to enable the application to determine a pre-requested buffer storage area through the display storage buffer information, and submit the submission information based on the pre-requested buffer storage area.

19. The medium of claim 14, wherein the instructions further cause the device to:

create the server process based on the extension protocol of the second communications protocol; and construct, through the server process, the virtual display screen based on the extension protocol of the second communications protocol.

* * * * *